US009380361B2

(12) United States Patent
You et al.

(10) Patent No.: US 9,380,361 B2
(45) Date of Patent: Jun. 28, 2016

(54) WAVELENGTH SELECTIVE SWITCH AND WAVELENGTH SELECTION METHOD

(71) Applicant: WUHAN RESEARCH INSTITUTE OF POSTS AND TELECOMMUNICATIONS, Wuhan (CN)

(72) Inventors: Quan You, Wuhan (CN); Dequan Xie, Wuhan (CN); Zichen Liu, Wuhan (CN); Ying Qiu, Wuhan (CN); Miaofeng Li, Wuhan (CN); Qi Yang, Wuhan (CN)

(73) Assignee: WUHAN RESEARCH INSTITUTE OF POSTS AND TELECOMMUNICATIONS, Wuhan (CN)

( * ) Notice: Subject to any disclaimer, the term of this patent is extended or adjusted under 35 U.S.C. 154(b) by 29 days.

(21) Appl. No.: 14/338,846

(22) Filed: Jul. 23, 2014

(65) Prior Publication Data

US 2015/0037031 A1 Feb. 5, 2015

(30) Foreign Application Priority Data

Aug. 5, 2013 (CN) .......................... 2013 1 0336441

(51) Int. Cl.
*H04J 14/00* (2006.01)
*H04Q 11/00* (2006.01)
*H04J 14/02* (2006.01)

(52) U.S. Cl.
CPC ........ *H04Q 11/0005* (2013.01); *H04J 14/0212* (2013.01); *H04Q 2011/0022* (2013.01); *H04Q 2011/0026* (2013.01); *H04Q 2011/0032* (2013.01)

(58) Field of Classification Search
CPC ............. H04Q 11/0005; H04J 14/0212; H04J 14/0221
See application file for complete search history.

(56) References Cited

U.S. PATENT DOCUMENTS

| 2011/0031493 A1* | 2/2011 | Yamazaki | ........... H01L 27/1214 257/43 |
| 2011/0227060 A1* | 9/2011 | Miyanaga | ........... H01L 29/7869 257/43 |

(Continued)

FOREIGN PATENT DOCUMENTS

| CN | 1886691 | 12/2006 |
| CN | 1898584 | 1/2007 |

(Continued)

OTHER PUBLICATIONS

Chinese Patent Application No. 201310336441.4; State Intellectual Property Office of People's Republic of China, First Office Action mailed on Sep. 2, 2014; 7 pages.

(Continued)

*Primary Examiner* — Dzung Tran
(74) *Attorney, Agent, or Firm* — Peter Su; Dentons US LLP

(57) ABSTRACT

A wavelength selective switch and a wavelength selection method are provided. The wavelength selective switch comprises an input port, through which a light beam, including a plurality of optical signals having different wavelengths, is incident; a wavelength separation apparatus, including a Blue Phase Liquid Crystal (BPLC) device and configured to separate at least one optical signal from the light beam through the BPLC device; and at least one output port, configured to output the at least one optical signal separated by the wavelength separation apparatus respectively. With the wavelength selective switch and the wavelength selection method, a polarization-independent phase modulation can be realized without a depolarization device disposed in an optical path, which thereby simplifies an optical path, reduces an insertion loss, and lowers costs of the wavelength selective switch and even the entire optical communication system.

6 Claims, 4 Drawing Sheets

(56) References Cited

U.S. PATENT DOCUMENTS

2012/0218325 A1* 8/2012 Hiroki ................. G09G 3/003
                                                    345/697
2014/0363162 A1* 12/2014 Chu ..................... B82Y 20/00
                                                    398/49

FOREIGN PATENT DOCUMENTS

| CN | 103069320 | 4/2013 |
| JP | 2008268724 | 11/2008 |

OTHER PUBLICATIONS

English Translation of First Office Action for Chinese Patent Application No. 201310336441.4; State Intellectual Property Office of People's Republic of China, First Office Action mailed on Sep. 2, 2014; 9 pages.

English Abstract of Chinese Patent Application No. 1886691A; Published on Dec. 27, 2006; 1 page.

English Abstract of Chinese Patent Application No. 1898584A; Published on Jan. 17, 2007; 1 page.

English Abstract of Chinese Patent Application No. 2008268724A; Published on Nov. 6, 2008; 1 page.

Chinese Patent Application No. 201310336441.4, State Intellectual Property Office of People's Republic of China, Second Office Action mailed on Apr. 3, 2015; 9 pages.

English Text Translation of Second Office Action for Chinese Patent Application No. 201310336441.4, State Intellectual Property Office of People's Republic of China, Second Office Action mailed on Apr. 3, 2015; 8 pages.

English Abstract of Chinese Patent Application No. CN103069320 (A), published on Apr. 24, 2013, Huawei Tech Co Ltd; 2 pages.

Chinese Patent Application No. 201310336441.4, Chinese Patent Office, Third Office Action mailed on Sep. 18, 2015; 7 pages.

English Text Translation of Third Office Action for Chinese Patent Application No. 201310336441.4, Chinese Patent Office, Third Office Action mailed on Sep. 18, 2015; 7 pages.

* cited by examiner

US 9,380,361 B2

WAVELENGTH SELECTIVE SWITCH AND WAVELENGTH SELECTION METHOD

CROSS REFERENCE TO RELATED APPLICATIONS

This application is based upon and claims the benefit of priority under 35 U.S.C. §119(a) from the prior Chinese Patent Application No. 201310336441.4, filed in the State Intellectual Property Office of the P.R.C. on Aug. 5, 2013, the disclosure of which is hereby incorporated by reference in its entirety.

TECHNICAL FIELD

The present disclosure relates to an optical communication technology and, more particularly, to a wavelength selective switch for optical communication and a corresponding wavelength selection method.

BACKGROUND

Wavelength Division Multiplexing (WDM) is a currently common optical layer networking technology, and it is easy to realize a transmission capacity of Gbit/s or even Tbit/s by multiplexing different wavelengths into an optical fiber for transmission. A Reconfigurable Optical Add/Drop Multiplexer (ROADM), which is a core optical switching device in a WDM network, can configure any wavelength at any port. A wavelength selective switch (WSS) is a new-generation technology used to realize a dynamic ROADM, and has a function of selecting and outputting a particular wavelength from input wavelengths.

A WSS based on Liquid Crystal on Silicon (LCOS) can realize flexible tuning of a channel center frequency and a channel bandwidth, and such bandwidth-tunable WSS can meet requirements of operators for a ROADM with a flexible bandwidth in a next-generation network. LCOS is a spatial light modulation device, which controls a phase of each liquid crystal cell through a voltage to adjust the wavefront of an incident light, so that a direction of the incident light is deflected. Generally, a conventional LCOS uses a nematic phase liquid crystal material. Since the nematic phase liquid crystal has optical anisotropy, it presents different refractive indices for light components of different polarization types when the incident light undergoes a phase modulation. Thus, the LCOS has polarization dependence. In order to eliminate the polarization dependence, a depolarization device must be disposed in the LCOS-based WSS. This will increase complexity of an optical path, bring an insertion loss (about 0.5 dB), and increase a cost.

Therefore, there is a need for a new wavelength selective switch, which can realize wavelength selection through a simple structure and meanwhile reduce the insertion loss brought by the wavelength selective switch.

SUMMARY

The present disclosure is made in view of the above problem. An object of the present disclosure is to provide a wavelength selective switch, which can realize wavelength selection through a simple structure and meanwhile have a low insertion loss and a low cost. Another object of the present disclosure is to provide a corresponding wavelength selection method.

According to an aspect of the present disclosure, there is provided a wavelength selective switch, comprising an input port, through which a light beam, including a plurality of optical signals having different wavelengths, is incident; a wavelength separation apparatus, including a Blue Phase Liquid Crystal (BPLC) device and configured to separate at least one optical signal from the light beam through the BPLC device; and at least one output port, configured to output the at least one optical signal separated by the wavelength separation apparatus respectively.

According to another aspect of the present disclosure, there is provided a wavelength selection method executed by a wavelength selective switch, including an input port, a wavelength separation apparatus, including a BPLC device, and at least one output port, the wavelength selection method comprising enabling a light beam, including a plurality of optical signals having different wavelengths, to be incident through the input port, separating at least one optical signal from the light beam through the BPLC device; and outputting the at least one optical signal separated through the at least one output port respectively.

In the wavelength selective switch and the wavelength selection method according to the above aspects of the present disclosure, the BPLC device is used as a spatial light modulator to select at least one optical signal from the light beam in which a plurality of optical signals having different wavelengths are multiplexed. Thereby, a polarization-independent phase modulation can be realized without the need to dispose a depolarization device in an optical path, which thereby simplifies the optical path, reduces the insertion loss, polarization mode dispersion (PMD) and polarization-dependent loss (PDL), and so on, and lowers costs of the wavelength selective switch and even the entire optical communication system.

BRIEF DESCRIPTION OF THE DRAWINGS

The above and other objects, features and advantages of the present disclosure will become more apparent from a detailed description of embodiments thereof in conjunction with accompanying drawings, in which.

DETAILED DESCRIPTION

Figure 1:
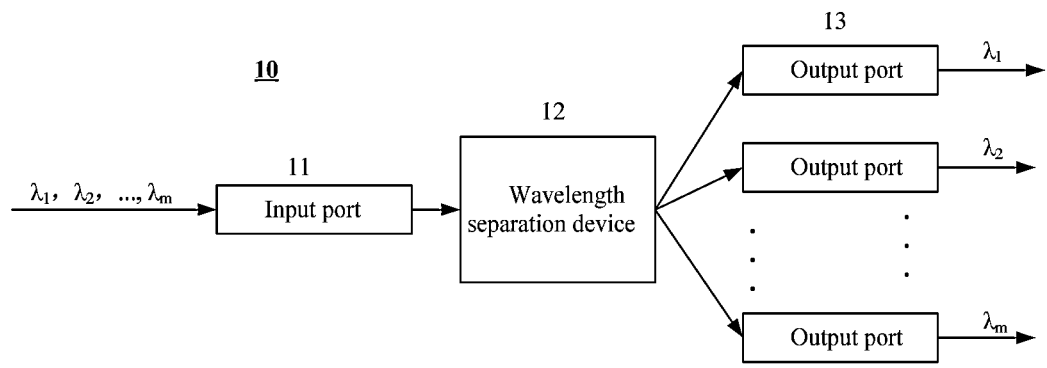
FIG. 1 is a schematic structural block diagram of a wavelength selective switch according to an embodiment of the present disclosure.

A Blue Phase Liquid Crystal (BPLC) is a liquid crystal material with a self-assembly structure having a twisted double helix. BPLC molecules can be assembled spontaneously to form a three-dimensional spatial structure having optical isotropy, without a birefringence phenomenon, which can be caused by other types of liquid crystals; thereby they can realize modulation on unpolarized light. Moreover, the optical isotropy and a Kerr effect specific to the BPLC can further reduce the insertion loss, and response time for the BPLC to be transformed from an optical isotropy state to an optical anisotropy state is less than 1 ms, which is faster than a response rate of an ordinary liquid crystal by one order of magnitude. Based on the above advantages of the BPLC, the inventors propose a wavelength selective switch based on a BPLC device according to an embodiment of the present disclosure and a corresponding wavelength selection method.

Hereinafter, the wavelength selective switch and the wavelength selection method according to the embodiments of the present disclosure will be described with reference to the accompanying drawings. Like reference numerals denote like elements throughout the accompanying drawings.

First, the wavelength selective switch according to the embodiment of the present disclosure is described with reference to FIG. 1.

As shown in FIG. 1, the wavelength selective switch 10 comprises an input port 11, a wavelength separation apparatus 12, and at least one output port 13.

The input port 11 may be formed by an optical fiber, through which a light beam (hereinafter referred to as a multiplexed light beam for convenience of description), including a plurality of optical signals having different wavelengths ($\lambda_1$, $\lambda_2$, ..., $\lambda_m$, m≥2), can be incident onto the wavelength selective switch 10. The light beam may be, for example, a WDM signal formed by multiplexing the plurality of optical signals together by using a WDM technology. The wavelengths may be those commonly used in a WDM optical communication system, e.g., wavelengths within a range from 1,530 nm to 1,565 nm, or other wavelengths.

The wavelength separation apparatus 12 includes a BPLC device, and can separate from the light beam at least one optical signal, i.e., one of, a plurality of, or all of the plurality of optical signals, through the BPLC device. Specifically, the wavelength separation apparatus 12 may deflect the at least one optical signal with respect to an incident direction of the light beam by a deflection amount different from those of the other optical signals in the light beam, so as to separate the at least one optical signal. As described below, the BPLC device may be a blue liquid crystal panel having a plurality of liquid crystal cells, in which case the deflection amount of the at least one optical signal may be adjusted by adjusting a phase arrangement of the liquid crystal cells in a region onto which the at least one optical signal is incident, such that the at least one optical signal is deflected by the deflection amount different from those of the other optical signals. The wavelength separation apparatus 12 will be described in detail later.

The at least one output port 13 receives the at least one optical signal separated by the wavelength separation apparatus 12 and outputs the received optical signal. That is to say, a number of the output port 13 is equal to that of the optical signal separated by the wavelength separation apparatus 12, such that each output port 13 receives and outputs one optical signal. The output port 13 may be formed by an optical fiber.

The wavelength selective switch shown in FIG. 1 may be implemented in many manners, and an exemplary implementation of the wavelength selective switch will be described below.

Figure 2A:
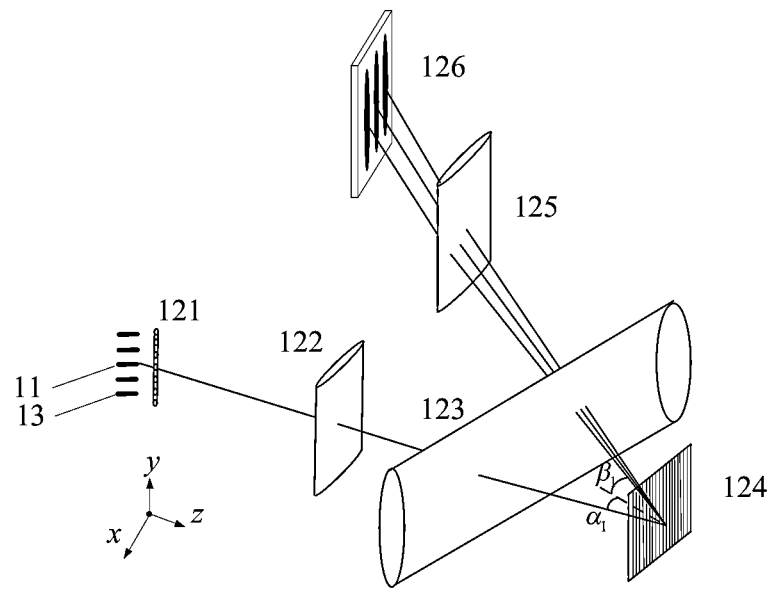
FIG. 2A is a diagram schematically showing an exemplary implementation of the wavelength selective switch according to the embodiment of the present disclosure.

As shown in FIG. 2A, the wavelength selective switch 10 comprises an input optical fiber 11, a micro-sphere lens array 121, a cylindrical lens 122, a cylindrical lens 123, a diffraction grating 124, a cylindrical lens 125, a BPLC device 126, and at least one output optical fiber 13 (as an example, four output optical fibers are shown in FIG. 2). The input optical fiber 11 serves as the input port of the wavelength selective switch 10. The micro-sphere lens array 121, the cylindrical lens 122, the cylindrical lens 123, the diffraction grating 124, the cylindrical lens 125, and the BPLC device 126 form the wavelength separation apparatus of the wavelength selective switch 10. The at least one output optical fiber 13 serves as the output port of the wavelength selective switch 10.

The input fiber 11 and the at least one output fiber 13 may be arranged as an optical fiber array in a certain direction. Preferably, the respective optical fibers can be spaced from each other at equal intervals. In the example shown in FIG. 2, the input optical fiber 11 is located in the middle of the optical fiber array, and the respective output optical fibers 13 are located on both sides of the input optical fiber 11. In another example, the respective output optical fibers 13 may be located on the same side of the optical fiber 11.

Figure 2B:
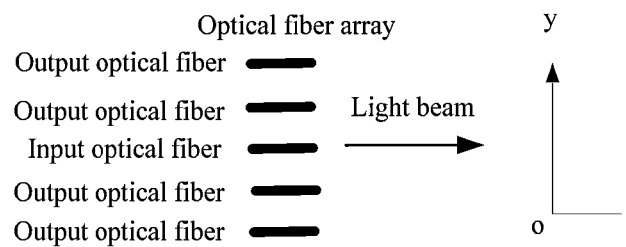
FIG. 2B is a diagram schematically showing a y-axis and a z-axis of a three-dimensional coordinate system established in FIG. 2A.

For convenience of description, a three-dimensional coordinate system is established in FIG. 2A. In particular, a direction in which the respective optical fibers in the optical fiber array are arranged may be defined as a y-direction, and a direction which is perpendicular to the y-direction and in which the light beam emitted from the input optical fiber 11 propagates may be defined as a z-direction, as shown in FIG. 2A and FIG. 2B. Accordingly, a direction perpendicular to a y-z plane formed by the y axis and the z axis may be defined as an x-direction. It is to be noted that in the example shown in FIG. 2A, as described below, the light beam diffracts at the diffraction grating 124, so that a propagation direction of the light beam in the x-z plane changes, in which case the changed propagation direction can still be used as the z-direction, the three-dimensional coordinate system (specifically, the x-axis) is rotated accordingly, and such rotation will not affect implementation of the present disclosure; however, when the z-direction is mentioned in a case where a certain element shown in FIG. 2 is described below, the z-direction refers to the propagation direction of the light beam in a position where the element is located.

The micro-sphere lens array 121 is an array formed by arranging a plurality of micro-sphere lens in the y-direction, each of the micro-sphere lenses corresponding to one optical fiber in the optical fiber array.

The cylindrical lens 122 is a cylindrical lens in the x-direction. That is, for a light beam passing through the cylindrical lens 122 in the z-direction, a cross section of the cylindrical lens 122 in the y-z plane is a plane cylinder, and a cross section thereof in the x-z plane is a convex lens. Therefore, when the light beam passes through the cylindrical lens 122, the light beam remains unchanged in the y-direction.

The cylindrical lens 123 is a cylindrical lens in the y-direction. That is, for a light beam passing through the cylindrical lens 123 in the z-direction, the cylindrical lens 123 is a plane cylinder in the x-z plane, and is a convex lens in the y-z plane. Therefore, when the light beam passes through the cylindrical lens 123, the light beam remains unchanged in the x-direction.

The diffraction grating 124 is a reflective diffraction grating. When the light beam is incident onto the diffraction grating 124, diffraction will occur. A reflective diffraction grating commonly known in the art may be used as the diffraction grating 124.

The cylindrical lens 125 is a cylindrical lens in the x-direction. That is, for a light beam passing through the cylindrical lens 125 in the z-direction, a cross section of the cylindrical lens 125 in the y-z plane is a plane cylinder, and a cross section thereof in the x-z plane is a convex lens. Therefore, when the light beam passes through the cylindrical lens 125, the light beam remains unchanged in the y-direction.

The BPLC device 126 is a BPLC panel formed by a plurality of BPLC cells (or pixels). The structure and properties of the BPLC cell are commonly known in the art, and a description thereof will be omitted here. As described below, by adjusting voltages applied to respective liquid crystal cells in different regions of the BPLC device 126a, phase arrangements of the liquid crystal cells in the regions may be changed, so that the regions of the BPLC device 126 become a diffraction grating, thereby the at least one optical signal is separated from the light beam through diffraction, realizing a wavelength selection.

Hereinafter, a process for performing the wavelength selection by using the wavelength selective switch 10 will be described in detail.

First, processing on the light beam (multiplexed light beam) incident through the input optical fiber 11 performed by the wavelength selective switch 10 in the x-z plane is described with reference to FIG. 2A and FIG. 3. For simplicity, only an optical signal of a single wavelength (set as $\lambda_i$, $1 \le i \le m$) (hereinafter referred to as a single-wavelength light beam for convenience) in the multiplexed light beam will be described hereinafter, and the description is also applicable to other optical signals in the light beam.

Figure 3:
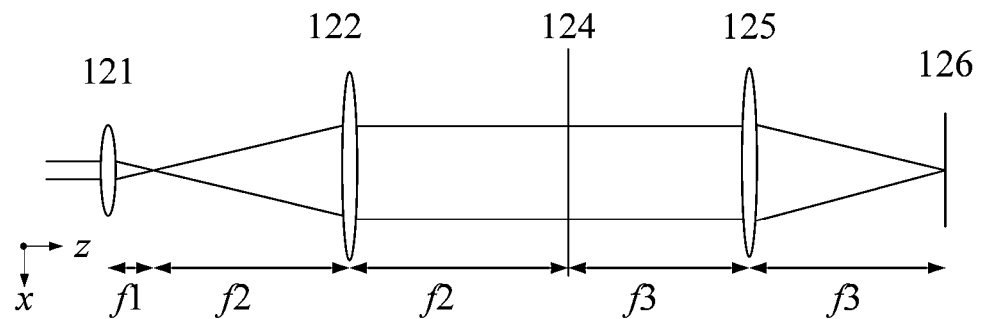
FIG. 3 schematically illustrates an equivalent optical path diagram of a wavelength selective switch shown in FIG. 2A in an x-z plane, for an optical signal of a single wavelength.

FIG. 3 schematically illustrates an equivalent optical path diagram of the wavelength selective switch shown in FIG. 2A in the x-z plane, for the single-wavelength light beam, where the cylindrical lens 123 which does not change the light beam in the x-direction is omitted, and the micro-sphere lenses 121 corresponding to the input optical fiber 11, the cylindrical lens 122, and the cylindrical lens 125 are presented as convex lenses. Furthermore, although in the present implementation the diffraction grating 124 is a reflective diffraction grating, i.e., the single-wavelength light beam incident onto the diffraction grating 124 and a single-wavelength light beam emitted from the diffraction grating 124 are in different directions, the single-wavelength light beam incident onto the diffraction grating 124 and the single-wavelength light beam emitted from the diffraction grating 124 are shown equivalently to be in the same direction in FIG. 3 for convenience of illustration.

In the x-z plane, it is assumed that a focal length of the micro-sphere lens 121 is $f_1$, a focal length of the cylindrical lens 122 is $f_2$, and a focal length of the cylindrical lens 125 is $f_3$. The micro-sphere lens 121, the cylindrical lens 122, the diffraction grating 124, the cylindrical lens 125, and the BPLC device 126 are arranged so that distances among them satisfy the relationship shown in FIG. 3, that is, a distance between the micro-sphere lens 121 and the cylindrical lens 122 is $f_1+f_2$, a distance between the cylindrical lens 122 and the diffraction grating 124 is $f_2$, a distance between the diffraction grating 124 and the cylindrical lens 125 is $f_3$, and a distance between the cylindrical lens 125 and the BPLC device 126 is f3. The distances described herein refer to distances on the light path.

The micro-sphere lens 121 and the cylindrical lens 122 form a telescopic beam expander system. For the single-wavelength light beam incident onto the micro-sphere lens 121, the light beam is converged onto a focal point of the cylindrical lens 122 and then is beam-expanded by the cylindrical lens 122. Thus, a light spot of the single-wavelength light beam is expanded in the x-direction, so as to increase a diffraction efficiency of the single-wavelength light beam at the diffraction grating 124.

The single-wavelength light beam emitted from the cylindrical lens 122 is incident onto the diffraction grating 124 at an incidence angle (set as $\alpha_1$), and is diffracted at the diffraction grating 124, so as to be emitted at a diffraction angle (set as $\beta_1$). The diffracted single-wavelength light beam is incident onto the cylindrical lens 125, which converges the light beam onto the BPLC device 126.

According to a diffraction principle, the diffraction of the single-wavelength light beam at the diffraction grating 124 satisfies the following formula:

$$n_1 \lambda_i = d_1 (\sin \alpha_1 + \sin \beta_1) \quad (1)$$

where $n_1$ is a diffraction order, and $d_1$ is a grating constant of the diffraction grating 124. Since energy of the incident light beam is mainly concentrated in a first-order diffracted light, only the first-order diffracted light may be considered, i.e., $n_1=1$. According to the above formula (1), it can be known that the diffraction angle $\beta_1$ depends on the wavelength $\lambda_i$ of the single-wavelength light beam. Therefore, under a condition where the incident angles are the same, the diffraction angle of the single-wavelength light beam is different from the diffraction angles of the optical signals of other wavelengths in the multiplexed light beam. In other words, the diffraction grating 124 actually serves as a light separation device, which separates the single-wavelength optical signal from the other optical signals in the multiplexed light beam in the x-direction. Accordingly, the respective separated optical signals are converged onto different regions (in the x-direction) of the BPLC device by the cylindrical lens 125, as schematically illustrated in FIG. 2.

Figure 4:
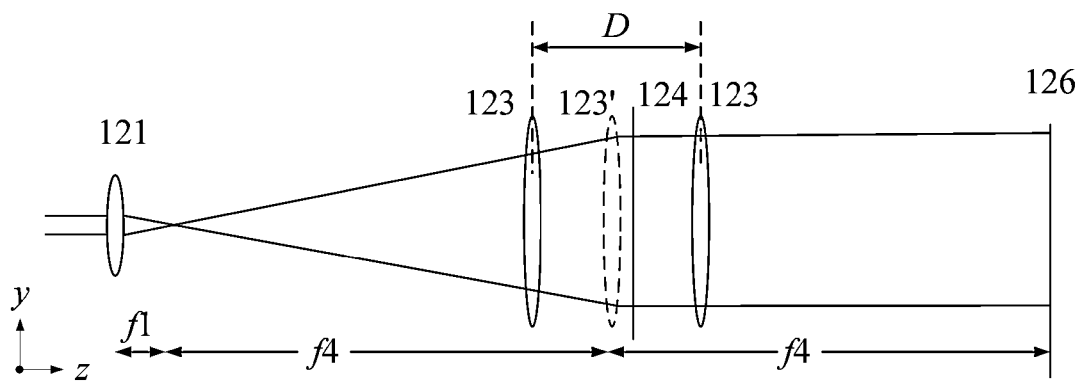
FIG. 4 schematically illustrates an equivalent optical path diagram of the wavelength selective switch shown in FIG. 2A in a y-z plane, for an optical signal of a single wavelength.

Next, with reference to FIG. 2A and FIG. 4, processing on the single-wavelength light beam performed by the wavelength selective switch 10 in the y-z plane is described. FIG. 4 schematically illustrates an equivalent optical path diagram of the wavelength selective switch shown in FIG. 2A in the y-z plane for the single-wavelength light beam, where the cylindrical lens 122 and the cylindrical lens 125 which do not change the light beam in the y-direction are omitted, and the micro-sphere lenses 121 corresponding to the input optical fiber and the cylindrical lens 123 are presented as convex lenses. Since the single-wavelength light beam passes through the cylindrical lens 123 twice, two cylindrical lenses 123 are shown in the equivalent optical path diagram. Likewise, for convenience of illustration, the single-wavelength light beam incident onto the diffraction grating 124 and a single-wavelength light beam emitted from the diffraction grating 124 are shown equivalently to be in the same direction.

By selecting relative positions of the cylindrical lens 123 and the diffraction grating 124, the two cylindrical lenses 123 as shown in FIG. 4 can form an equivalent combined lens 123'. It is assumed that a focal length of the combined lens 123' is $f_4$. The cylindrical lens 123 is arranged so that a distance between the combined lens 123' and the micro-sphere lens 121 is $f_1+f_4$, thereby the micro-sphere lens 121 and the combined lens 123' form a telescopic expander system. The single-wavelength light beam incident onto the micro-sphere lens 121 is converged onto a focal point of the combined lens 123', and then is beam-expanded by the combined lens 123', so that a light spot of the light beam is expanded in the y-direction. Thus, a diffraction efficiency of the diffraction of the light beam occurring at the BPLC device 126 can be improved.

Assuming a focal length of the cylindrical lens 123 is $f_5$, and in FIG. 4, a distance between the two cylindrical lenses 123 (i.e., a sum of an optical path length of the single-wavelength light beam incident onto the diffraction grating 124 from the cylindrical lens 123 at the incidence angle $\alpha_1$ and an optical path length of the single-wavelength light beam emitted from the diffraction grating 124 to the cylindrical lens 123 at the diffraction angle $\beta_1$ in FIG. 2) is D, it may be known according to principles of geometrical optics that $f_4$, $f_5$ and D satisfy the following relationship:

$$\frac{1}{f_4} = \frac{1}{f_5} + \frac{1}{f_5} - \frac{D}{f_5 \times f_5} \quad (2)$$

Furthermore, since the optical path length of the single-wavelength light beam in the x-z plane is equal to the optical path length of the single-wavelength light beam in the y-z plane, $$f_1+f_2+f_2+f_3+f_3=f_1+f_4+f_4 \quad (3)$$

That is, $$f_2+f_3=f_4 \quad (4)$$

Since $f_2$, $f_3$ and $f_5$ are known, D can be obtained according to the above formulae (2) and (4).

Figure 5:
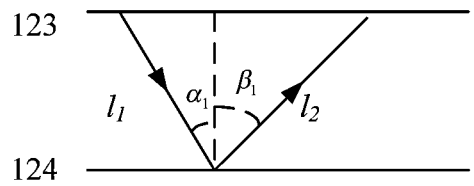
FIG. 5 schematically illustrates a method for calculating a distance between a cylindrical lens 123 and a diffraction grating 124 shown in FIG. 2A.

Then, relative positions of the cylindrical lens 123 and the diffraction grating 124 can be determined according to the incidence angle $\alpha_1$, the diffraction angle $\beta_1$ and D. Specifically, with reference to FIG. 5, it is assumed that in FIG. 2 the optical path length of the single-wavelength light beam incident onto the diffraction grating 124 from the cylindrical lens 123 at incidence angle $\alpha_1$ is $l_1$ and the optical path length of the single-wavelength light beam emitted from the diffraction grating 124 to the cylindrical lens 123 at the diffraction angle $\beta_1$ is $l_2$, then $l_1$ and $l_2$ satisfy:

$$l_1+l_2=D$$

$$l_1 \cos \alpha_1 = l_2 \cos \beta_1 \quad (5)$$

$l_1$ and $l_2$ can be obtained from formula (5), so that the relative position of the cylindrical lens 123 and the diffraction grating 124 can be determined.

The single-wavelength light beam emitted from the diffraction grating 124 is incident onto the BPLC device 126. Since the single-wavelength light beam is beam-expanded in the y-direction and is converged in the x-direction, the light spot of the single-wavelength light beam on the BPLC device 126 presents as an elongated ellipse, where a major axis of the ellipse is in the y-direction, as shown in FIG. 2.

The BPLC device 126 deflects the single-wavelength light beam incident thereto in the y-z plane (or in the y-direction) by a certain deflection amount. Specifically, as described above, a phase of each liquid crystal cell of the BPLC device 126 is adjustable; for example, the phase of each liquid crystal cell can be changed by changing a voltage applied to the liquid crystal cell. By using this property of the BPLC device, a phase arrangement in the y-direction of liquid crystal cells in a region, onto which the single-wavelength light beam is incident, of the BPLC device can be adjusted, to form an equivalent diffraction grating in the region, so that the single-wavelength light beam is diffracted at the diffraction grating, and is deflected in the y-z plane by a certain deflection amount.

Figure 6:
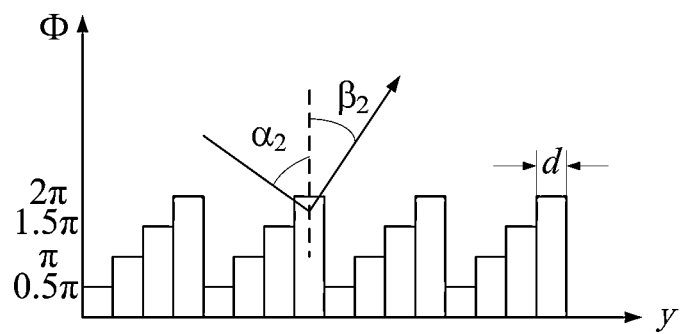
FIG. 6 schematically illustrates an equivalent diagram of a phase modulation by a BPLC device in a y-direction, for an optical signal of a single wavelength.

Specifically, as shown in FIG. 6, the phases of the respective liquid crystal cells in the region, onto which the single-wavelength light beam is incident, of the BPLC device can be adjusted, so that in the y-direction every M liquid crystal cells form one phase cycle from 0 to $2\pi$, where M is called a phase order of the liquid crystal cells. In the example shown in FIG. 6, every 4 liquid crystal cells form one phase cycle, and the phases of the 4 liquid crystal cells are $0.5\pi$, $\pi$, $1.57\pi$, and $2\pi$ sequentially, in which case the phase order M=4. Thus, in the y-direction, the liquid crystal cells in the region form a diffraction grating, so that the single-wavelength light beam incident onto the region is diffracted. Assuming a size of the liquid crystal cell in the BPLC device 126 in the y-direction is $d_2$, and in the y-z plane the single-wavelength light beam is incident onto the BPLC device 126 at an incidence angle $\alpha_2$ and emitted from the BPLC device 126 at a diffraction angle $\beta_2$, it can be known according to a diffraction formula that $$n_2\lambda_i = Md_2(\sin \alpha_2 + \sin \beta_2) \quad (6)$$

where $n_2$ is a diffraction order. Since a first-order diffracted light contains most of the energy of the single-wavelength light beam, $n_2=1$ is adopted. Thus, the diffraction angle $\beta_2$ can be obtained from formula (6):

$$\beta_2 = \sin^{-1}\left(\frac{\lambda_i}{Md_2} - \sin\alpha_2\right) \quad (7)$$

It can be known from formula (7) that the deflection amount of the single-wavelength light beam (represented by the diffraction angle $\beta_2$) relates to the phase order M. Therefore, the phase order M can be adjusted by adjusting the phase arrangement of the liquid crystal cells, so as to adjust the deflection amount or an emission direction of the single-wavelength light beam.

The single-wavelength light beam emitted from the BPLC device 126 will pass through the cylindrical lens 125 and the cylindrical lens 123 in sequence, be diffracted at the diffraction grating 124, then pass through the cylindrical lens 123, the cylindrical lens 122, and a corresponding micro-sphere lens in the micro-sphere lens array 121, and then return to the optical fiber array.

In the x-z plane, according to an optical path reversibility principle, the single-wavelength light beam will return to a position in the x-direction at the time when it is incident through the input optical fiber 11. However, in the y-z plane, since the single-wavelength light beam is deflected in its propagation direction at the BPLC device 126, the single-wavelength light beam will deviate from the input optical fiber 11 at the optical fiber array.

Figure 7:
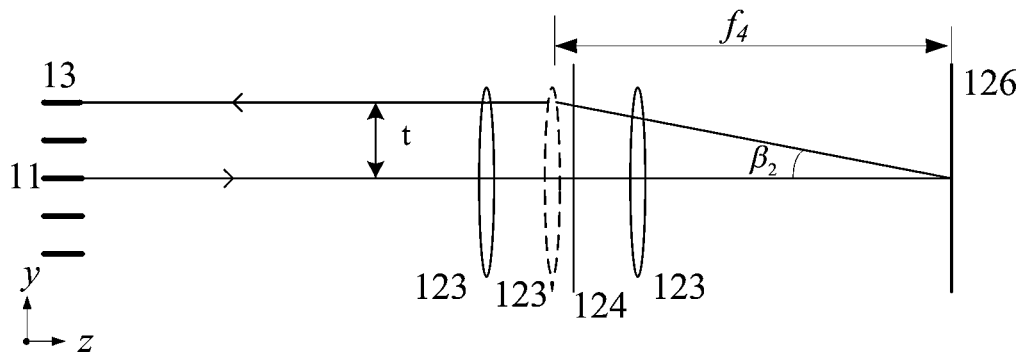
FIG. 7 schematically illustrates a method for calculating a deviation amount of a light beam of a single wavelength emitted from a BPLC device with respect to the incident direction thereof in a y-direction, when the light beam returns to an optical fiber array.

FIG. 7 schematically illustrates a method for calculating a deviation amount of the single-wavelength light beam with respect to an incident direction thereof (i.e., with respect to the input optical fiber 11) in the y-direction, when the single-wavelength light beam returns to the optical fiber array. In FIG. 7, for simplicity, a size of a light spot of the light beam is not shown, and the light beam is simplified into a line. As shown in FIG. 7, the deviation amount t of the light beam can be calculated by:

$$t = f_4 \cdot \tan \beta_2 \quad (8)$$

Therefore, the deviation amount t of the single-wavelength light beam with respect to the input optical fiber 11 in the y-direction when the light beam returns to the optical fiber array can be adjusted by adjusting the phase order M. Thus, by making t be equal to a distance between an output optical fiber specified to output the single-wavelength light beam and the input optical fiber 11 in the y-direction, the single-wavelength light beam can be made to be emitted from the output optical fiber, so as to realize selection of the single-wavelength light beam (the optical signal of a corresponding wavelength).

As described above, the optical signals of different wavelengths in the multiplexed light beam are respectively incident onto different regions of the BPLC device 126. Therefore, phase arrangements of liquid crystal cells in corresponding regions, onto which one or more optical signals are incident, of the BPLC device 126 may be adjusted in the above-described manner, so that the one or more optical signals are deflected in the y-direction by deflection amounts different from those of the other optical signals, and are outputted to outside of the wavelength selective switch through different output optical fibers. Thus, the optical signals of one or more wavelengths may be selected from the light beam, including the optical signals of the plurality of wavelengths.

It can be seen that, in the wavelength selective switch according to the above embodiment of the present disclosure, it is not necessary to dispose a depolarization device, thereby simplifying the optical path, and reducing the insertion loss, the polarization mode dispersion (PMD), the polarization-dependent loss (PDL) and the like. Furthermore, costs of the wavelength selective switch and even the entire optical communication system can be reduced. Additionally, since the response time of the BPLC is short, the wavelength selective switch according to the embodiment of the present disclosure can complete wavelength selection more quickly than conventional wavelength selective switches.

It is to be appreciated that the structure of the above wavelength selective switch is merely exemplary, and those skilled in the art can make various changes thereto without departing from the scope of the present disclosure. For example, although the diffraction grating 124 is used in the above as the light separation device to separate the optical signals of different wavelengths in the x-direction, this is not limitative, and other types of light separation devices can also be used to implement this separation. In the case of using the diffraction grating as the light separation device, a transmissive diffraction grating may be used in place of the reflective diffraction grating described above. Furthermore, although the three-dimensional coordinate system is established in a particular way in the above, it is to be recognized that this is not limitative, and the three-dimensional coordinate system can be established in other ways; for example, the above three-dimensional coordinate system can be rotated, so that respective coordinate axes thereof are interchanged. It is to be noted that, as known in the art, a focal length of a same convex lens may change for lights of different wavelengths. However, because such change is relatively small (especially in a wavelength range commonly used in the WDM system), the change can be ignored in the embodiments of the present disclosure.

Figure 8:
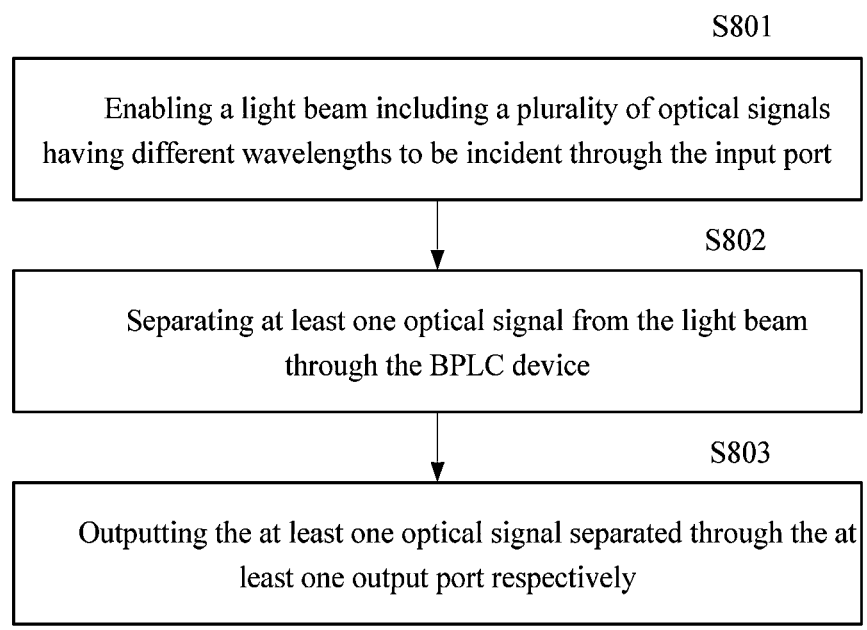
FIG. 8 is a flowchart showing a wavelength selection method according to an embodiment of the present disclosure.

Hereinafter, a wavelength selection method according to an embodiment of the present disclosure will be described. FIG. 8 illustrates a flowchart of the wavelength selection method according to the embodiment of the present disclosure. This method can be executed by the wavelength selective switch shown in FIG. 1 or FIG. 2. Since various details of the method have been described when the wavelength selective switch according to the embodiment of the present disclosure is described, the method is only briefly described here.

As shown in FIG. 8, in step S801, a light beam, including a plurality of optical signals having different wavelengths, is enabled to be incident through an input port of the wavelength selective switch. The input port is, for example, the input optical fiber 11 as shown in FIG. 2.

Then, in step S802, at least one optical signal is separated from the light beam by a BPLC device in the wavelength selective switch.

Specifically, the BPLC device may deflect the at least one optical signal with respect to an incident direction of the light beam by a deflection amount different from those of other optical signals in the light beam, so as to separate the at least one optical signal. For example, the BPLC device may be a blue liquid crystal panel having a plurality of liquid crystal cells, in which case the deflection amount of the at least one optical signal may be adjusted by adjusting a phase arrangement of liquid crystal cells in a region onto which the at least one optical signal is incident, such that the at least one optical signal is deflected by a deflection amount different from those of the other optical signals.

When wavelength selection is performed by using the wavelength selective switch in FIG. 2, the at least one optical signal may be separated from the other optical signals in the light beam in a first direction (x-direction) by a light separation device (e.g., the diffraction grating 124), and then the at least one optical signal may be deflected by the BPLC device 126 by a deflection amount different from those of the other optical signals in a second direction (y-direction).

In a case where the diffraction grating 124 is used as the light separation device, in order to increase a diffraction efficiency of the light beam on the diffraction grating, the light beam may be beam-expanded in the first direction by the cylindrical lens 122, so that the beam-expanded light beam is incident onto the diffraction grating 124. Then, the at least one optical signal emitted from the diffraction grating 124 may be converged onto a position, which is different from positions for the other optical signals, on the BPLC device 126 by the cylindrical lens 125 in the first direction (x-direction). Moreover, in order to improve the diffraction efficiency of the light beam on the BPLC device, the at least one optical signal emitted from the diffraction grating 124 may further be beam-expanded by the cylindrical lens 123 in the second direction (y-direction), so that the at least one beam-expanded optical signal is incident onto the cylindrical lens 125.

With further reference to FIG. 8, in step S803, the at least one separated optical signal is outputted respectively through at least one output port. Thus, the at least one optical signal can be selected from the light beam, including the optical signals of the plurality of wavelengths.

With the wavelength selection method according to the embodiment of the present disclosure, the wavelength selection can be implemented easily and quickly without a depolarization device.

Although the exemplary embodiments of the present disclosure have been shown and described, those skilled in the art will understand that various modifications may be made to the exemplary embodiments in form and details without departing from the scope and spirit of the present disclosure as defined by the claims and equivalent thereof.

What is claimed is:

1. A wavelength selective switch, comprising:
   an input port, through which a light beam including a plurality of optical signals having different wavelengths is incident;
   a wavelength separation apparatus, including a Blue Phase Liquid Crystal (BPLC) device, and configured to separate at least one optical signal from the light beam through the BPLC device, wherein the BPLC device is configured to deflect the at least one optical signal by the deflection amount different from those of the other optical signals in a second direction;

at least one output port configured to output the at least one optical signal separated by the wavelength separation apparatus respectively, wherein the wavelength separation apparatus includes a diffraction grating configured to separate the at least one optical signal from the other optical signals in a first direction;

a first lens, configured to beam-expand the light beam in the first direction, so that the beam-expanded light beam is incident onto the diffraction grating;

a second lens, configured to converge the at least one optical signal emitted from the diffraction grating onto a position, which is different from positions of the other optical signals, of the BPLC device; and a third lens, configured to beam-expand the at least one optical signal emitted from the diffraction grating in the second direction, so that the at least one beam-expanded optical signal is incident onto the second lens.

2. The wavelength selective switch of claim 1, wherein the wavelength separation apparatus deflects the at least one optical signal with respect to an incident direction of the light beam through the BPLC device by a deflection amount different from those of other optical signals in the light beam, so as to separate the at least one optical signal.

3. The wavelength selective switch of claim 2, wherein the BPLC device is a blue liquid crystal panel having a plurality of liquid crystal cells, and wherein the deflection amount of the at least one optical signal is adjusted by adjusting a phase arrangement of liquid crystal cells in a region onto which the at least one optical signal is incident, such that the at least one optical signal is deflected by the deflection amount different from those of the other optical signals.

4. A wavelength selection method executed by a wavelength selective switch including an input port, a wavelength separation apparatus including a Blue Phase Liquid Crystal (BPLC) device, and at least one output port, the wavelength selection method comprising:

enabling a light beam including a plurality of optical signals having different wavelengths to be incident through the input port;

beam-expanding, by a first lens, the light beam in the first direction, so that the beam-expanded light beam is incident onto a light separation device;

separating, by a light separation device, the at least one optical signal from the other optical signals in a first direction; beam-expanding, by a third lens, the at least one optical signal emitted from the light separation device in the second direction, so that the at least one beam-expanded optical signal is incident onto the second lens;

converging, by a second lens, the at least one optical signal emitted from the light separation device onto a position, which is different from positions for the other optical signals, of the BPLC device;

separating the at least one optical signal from the light beam through the BPLC device, wherein the at least one optical signal is deflected through the BPLC device by the deflection amount different from those of the other optical signals in a second direction; and outputting the at least one optical signal separated through the at least one output port respectively.

5. The wavelength selection method of claim 4, wherein the at least one optical signal is deflected with respect to an incident direction of the light beam through the BPLC device by a deflection amount different from those of other optical signals in the light beam, so as to separate the at least one optical signal.

6. The wavelength selection method of claim 5, wherein the BPLC device is a blue liquid crystal panel having a plurality of liquid crystal cells, and wherein the deflection amount of the at least one optical signal is adjusted by adjusting a phase arrangement of liquid crystal cells in a region onto which the at least one optical signal is incident, such that the at least one optical signal is deflected by the deflection amount different from those of the other optical signals.

* * * * *